H. S. BARTHOLOMEW.
Improvement in Ball Braces.
No. 4,519. Reissued Aug. 22, 1871.
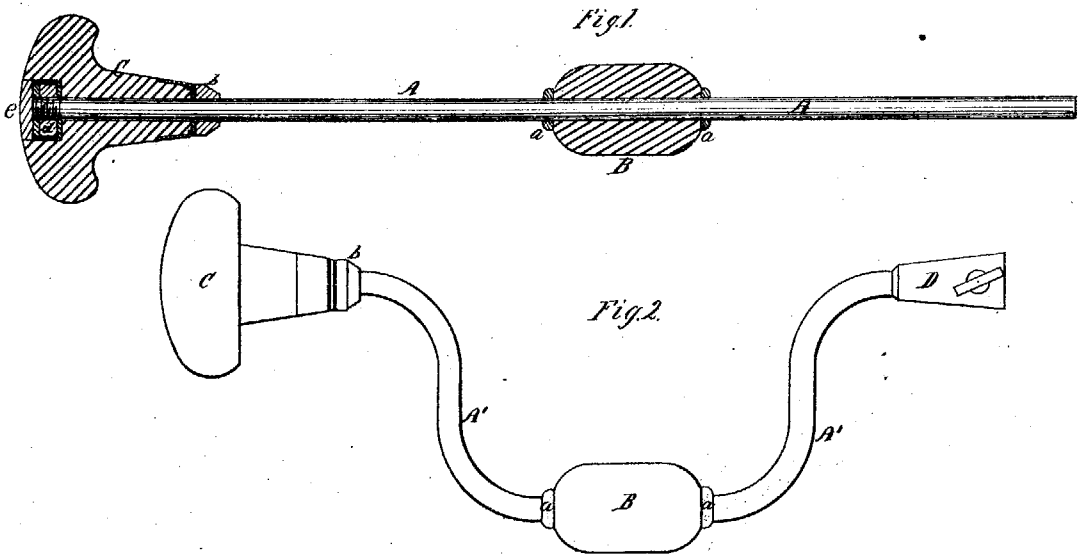
Witnesses,
Charles Chinn
Inventor
H. S. Bartholomew by
H. W. Beadle
atty.
AM. PHOTO-LITHOGRAPHIC CO. N.Y. (OSBORNE'S PROCESS.)

UNITED STATES PATENT OFFICE.

HARRY S. BARTHOLOMEW, OF BRISTOL, CONNECTICUT.

IMPROVEMENT IN BIT-BRACES.

Specification forming part of Letters Patent No. 32,347, dated May 21, 1861; reissue No. 1,351, dated November 4, 1862; reissue No. 4,519, dated August 22, 1871.

DIVISION B.

*To all whom it may concern:*

Be it known that I, HARRY S. BARTHOLOMEW, of Bristol, in the county of Hartford and State of Connecticut, have invented certain new and useful Improvements in Bit-Braces, of which the following is a specification:

My invention consists in the construction of the main portion or bow-shaped part of the brace from rods of wire, in the manner hereafter described.

In the accompanying drawing, Figure 1 is a section showing my invention in an incompleted state. Fig. 2 is a side elevation of my invention.

To construct these braces ordinary wire or braziers' rod, having the usual smooth and burnished surface caused by drawing through a die, and of a size suitable for the main portion or bow-shaped part of the brace, is cut into pieces of the proper length, and then placed in an ordinary tumbling-barrel with leather chips and tumbled until all foreign matter is removed, leaving the surface of the wire bright and smooth, suitable for a finished brace. The hand-block B, breast-pad C, and bit-holder D are secured to the rod A (which rod is a piece of wire) in the manner shown and described. In the drawing the hand-block is a solid piece placed on the rod before bending, and secured by collars. The bit-holder D is formed of a separate piece and secured to the rod A by shrinkage, and may be further secured by a pin. The sectional view, Fig. 1, fully shows the manner of securing the breast-block C; but neither the breast-block nor the bit-holder are claimed as my invention. After the hand-block B is secured in place in any proper manner, or dispensed with if desired, and the bit-holder D and breast-block C also secured, the wire A is placed in a suitable die and formed or swaged into form, as shown in Fig. 2. The die for forming the brace into shape should be smooth, and the brace should be formed when cold, so as not to mar or disfigure the polished surface of the wire.

Rolled or forged rods, in order to obtain a smooth surface, would necessitate polishing with emery or grinding, while a brace which is forged into shape must be polished after it is formed, if at all, which is a very inconvenient and expensive operation.

If desired the bit-holder D and breast-block C may not be attached to the wire A until after the same is formed.

By my invention I produce a brace constructed of wire in such manner that the surface of the wire forming the exposed portions of the bow-shaped part of the brace is not destroyed by heating, turning, or otherwise, whereby I am able to produce the finished brace at a much less cost than by any other method previously known.

Bit-braces may be made of wire by forging or turning off the surface of the wire to shape the same, &c. Any such use of wire I expressly disclaim, as it does not utilize the usual burnished surface of said wire.

I claim as my invention—

A bit-brace, the main portion or bow-shaped part of which is formed of wire, in the manner substantially as shown and described.

HARRY S. BARTHOLOMEW.

Witnesses:

JAMES SHEPARD,

C. A. SHEPARD.